Figure 1:
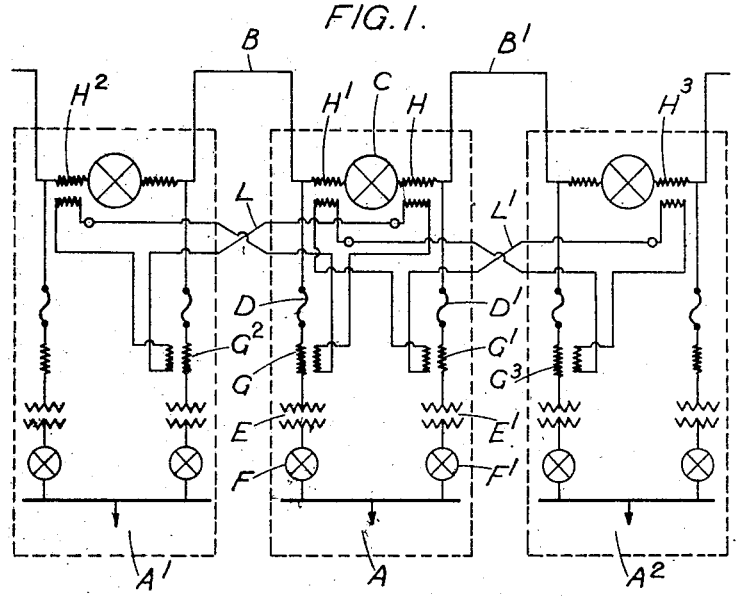

Mar. 3, 1925.

J. R. BEARD 1,528,362

ELECTRICAL DISTRIBUTION SYSTEMS

Filed June 4, 1924  2 Sheets-Sheet 1

INVENTOR
James Robert Beard,
BY Watson, Coit, Morse & Grindle
ATTYS.

Mar. 3, 1925.
J. R. BEARD
1,528,362
ELECTRICAL DISTRIBUTION SYSTEMS
Filed June 4, 1924   2 Sheets-Sheet 2
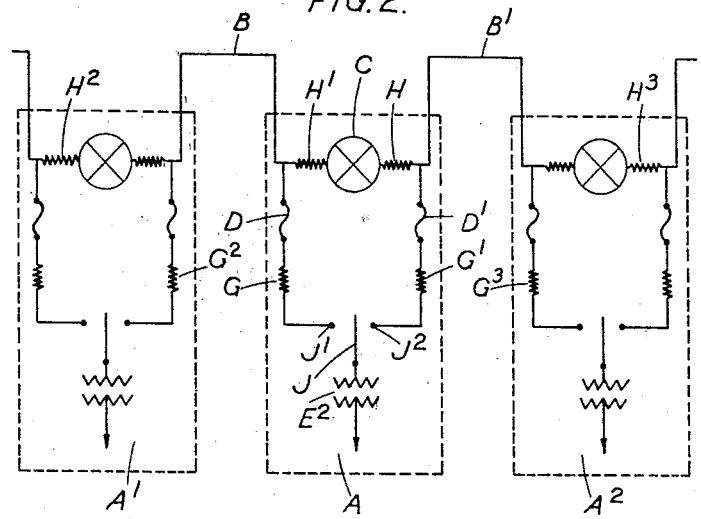
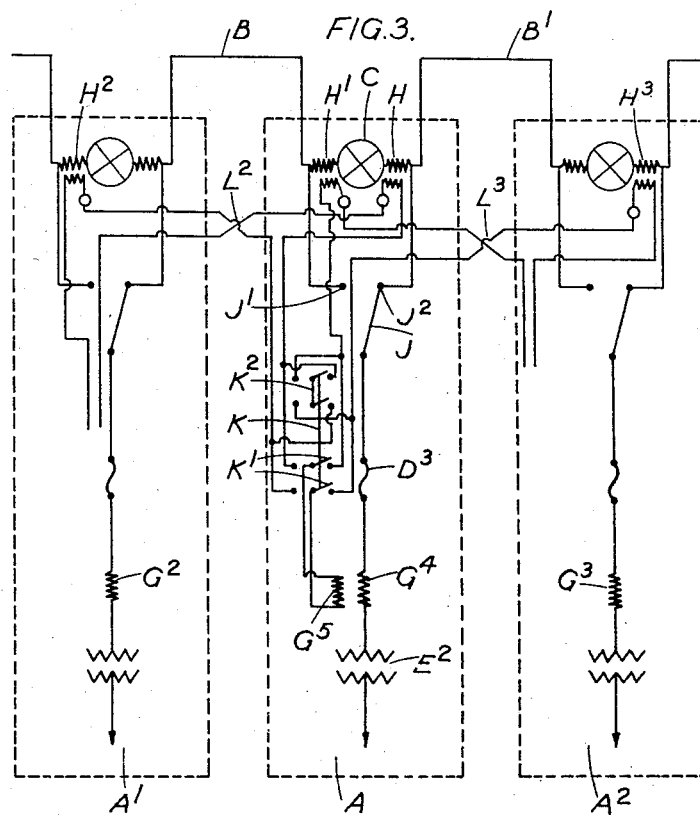

Patented Mar. 3, 1925.

1,528,362

UNITED STATES PATENT OFFICE.

JAMES ROBERT BEARD, OF LONDON, ENGLAND, ASSIGNOR TO ELECTRICAL IMPROVEMENTS LIMITED, OF NEWCASTLE-UPON-TYNE, ENGLAND, A BRITISH COMPANY.

ELECTRICAL DISTRIBUTION SYSTEM.

Application filed June 4, 1924. Serial No. 717,885.

*To all whom it may concern:*

Be it known that I, JAMES ROBERT BEARD, a subject of the King of England, and residing at London, in England, have invented certain new and useful Improvements in Electric Distribution Systems, of which the following is a specification.

This invention relates to electric distribution systems and has particular reference to an arrangement of switch gear at a "duplicate supply" sub-station connected to a high tension net work.

To afford adequate protection to such a sub-station it is usual to provide a high tension bus bar at the station fed from two high tension feeders and to take the power from the bus bar through two transformers. According to modern practice, in such an arrangement at least four high tension circuit breakers would be used one between each of the feeders and the bus bar and one between the bus bar and each of the transformers. In many cases a fifth switch or circuit breaker would be placed in the bus bar between the two feeding points in order that a fault on the bus bar circuit may be cleared without interrupting the supply to the sub-station and that the apparatus on either side may be repaired or maintained without interference with the other side.

With such an arrangement a reasonably reliable duplicate supply can be assured provided that the single high tension bus bar remains healthy but the cost of the switch gear is considerable. Further, if the bus bar breaks down, not only is the supply to the particular sub-station interfered with but the supply to other sub-stations on the same net work may also fail.

The object of the present invention is to give a more secure duplicate supply to a sub-station with a minimum amount of high tension switch gear thus reducing the cost and avoiding complication, and also improve the general security of the whole system.

According to this invention high tension bus bars are dispensed with and the two feeders are connected together through a high tension switch or circuit breaker and are also connected either directly or through fuses or switches of comparatively low rupturing capacity to one or more transformers. In cases where a duplicate low tension supply from the sub-station is required, two transformers are employed, and each feeder is connected to one of the transformers, whilst when a duplicate high tension supply only is required, a single transformer may be employed to which the two feeders are connected through a change-over switch.

Preferably each feeder comes from an adjacent and similarly arranged sub-station with one or two transformers, and each feeder section is provided with protective gear for example of the balanced type, the high tension circuit breaker (which may be the only circuit breaker of large rupturing capacity in the sub-station) conveniently being included in the protection by overlapping the protective gear.

The improved arrangement not only reduces the number of high tension circuit breakers necessary for each sub-station but also makes the application of the protective gear more simple than in usual arrangements and enables the protective gear to embrace the whole of the apparatus so that any fault whatever will be cleared at the sub-station on either side and thus limit the interruption to the one sub-station affected.

The invention may be carried into practice in various ways but the accompanying drawings illustrate diagrammatically by way of example some preferred arrangements according thereto. In these drawings,—

Figure 1 shows an arrangement giving duplicate high tension and low tension supplies, and Figures 2 and 3 show arrangements in which a duplicate high tension supply only is employed.

Like reference letters indicate like parts in the various figures.

In the arrangement shown in Figure 1, the substation A is supplied with high tension current through the two feeders B B' coming from adjacent similarly arranged substations A' A². The two feeders B B' are connected together through the high tension circuit breaker C and are also respectively connected through fuses D D' to two transformers E E'. Low tension circuit breakers F F' are also provided in the low tension supply circuits from the transformers E E'.

Each feeder section B (or B') is provided with balanced protective gear, the pilot circuit L (or L') in each case being controlled by two current transformers in the substation A and by two similarly arranged transformers in the substation A' (or $A^2$) at the other end of the feeder section in question. The primary winding of one of these two transformers is disposed, as indicated at G (or G') between the fuse D (or D') and the transformer E (or E') in the circuit adjacent to the protected feeder section, whilst the other primary winding is disposed, as indicated at H (or H') on the side of the high tension circuit breaker C remote from the protected section. Thus the feeder B is protected by means of a pilot circuit L controlled from the two current transformers G H in the substation A and two corresponding current transformers $G^2$ $H^2$ in the substation A', the circuit breaker C and the fuse D together with the corresponding circuit breaker and fuse in the substation A' being included within the protection. The feeder B' has similar protection, which also includes the circuit breaker C and the fuse D', the pilot circuit L' in this case being controlled from the two current transformers G' H' and the corresponding current transformers $G^3$ $H^3$ in the substation $A^2$. Any suitable type of balanced protective gear, such for example as the Merz-Price type, may be employed.

With this arrangement both transformers will normally be in service and a duplicate low tension supply is thus provided. If one of the feeders, say the feeder B, breaks down, the protective gear controlled by the current transformers G H $G^2$ $H^2$ will operate to cut out the faulty feeder B, but the low tension supply will be maintained through the feeder B' and the transformer E'.

In some cases it is unnecessary to provide a duplicate low tension supply, and Figures 2 and 3 show alternative arrangements for such cases.

In Figure 2 the general arrangement is similar to that of Figure 1 with the exception that a single transformer $E^2$ is employed in place of the two transformers E E', this transformer $E^2$ being connected through a change-over switch J to one or other of its two contacts J' or $J^2$ and thence to the feeder B or B' through the fuse D or D'. The protective gear (of which the secondary circuit is omitted for the sake of clearness) is also arranged as in Figure 1, the two primary windings at G G' being disposed between the change-over switch J and the fuses D D' respectively.

With this arrangement only one fuse D or D' is normally in service according to the position of the change-over switch J. Thus if a fault occurs in the feeder B' when the switch J is closed on its contact J', the protective gear between G' H' $G^3$ $H^3$ will operate to cut out the faulty feeder B', but the supply to the sub-station A will be maintained through the feeder B. If however a fault occurs in the feeder B when the switch J is closed on its contact J', the supply to the sub-station will be completely interrupted by the operation of the protective gear between G H $G^2$ $H^2$. Supply can be resumed however up to full capacity by throwing over the switch J on to its other contact $J^2$. This may be effected automatically, if desired, from the failure of the consumer's supply. The failure of the single transformer completely interrupts the low tension supply from the sub-station A.

The arrangement shown in Figure 3 only differs from that of Figure 2, as far as the main circuit is concerned, in that only one fuse $D^3$ is employed, the change-over switch J being disposed between this fuse $D^3$ and the two feeders B B'. Some modification of the balanced protective gear is however necessary with this arrangement, and the pilot circuits $L^2$ $L^3$ are therefore shown in this figure. The two current transformer primary windings H H' one on each side of the high tension circuit breaker C are again employed as in the arrangement of Figure 2, but the other two primary windings G G' are in this case replaced by a single transformer primary winding $G^4$ which is common to the two protective gears for the feeder sections B and B'. The secondary winding $G^5$ for this primary $G^4$ is, however, connected up only to one of the two pilot circuits $L^2$ $L^3$, a change-over switch K being provided to determine to which pilot circuit this secondary $G^5$ is to be connected. The switch K has two separate pairs of arms K' $K^2$ of which the pair K' serves to connect the secondary $G^5$ with one or other of the two pilot circuits $L^2$ (or $L^3$) whilst the pair $K^2$ acts to close the pilot circuit $L^3$ (or $L^2$), to which the secondary $G^5$ is not connected. The switch K is preferably mechanically interlocked with the switch J, so that the two switches move together, the arrangement being such that the secondary winding $G^5$ is always connected into the pilot circuit protecting the feeder section to which the transformer $E^2$ is connected through the main change-over switch J. Thus in the position shown in the figure the switch J is closed on its right-hand contact $J^2$ so that the transformer $E^2$ is connected directly to the feeder B'. The secondary $G^5$ is connected through the pair K' of switch arms into the pilot circuit $L^3$ protecting the feeder B', whilst the pair $K^2$ of switch arms serves to close the pilot circuit $L^2$ protecting the feeder B. If now the switch J is thrown over on to its left-hand contact J', the switch K is also thrown over on to its left-hand contacts, so that the secondary $G^5$ is now connected into the pilot circuit $L^2$, the other pilot circuit $L^3$ being closed by the switch arms K². With this arrangement the fuse D³ and the main circuit breaker C are again included in the protection.

This arrangement operates in exactly the same manner as the arrangement of Figure 2 with the exception that, when the change-over switch J is thrown over to resume the supply after it has been cut off by the operation of the protective gear, the switch K in the pilot circuits is also thrown over, thus ensuring that the fuse D³ is always included in the protection. With this arrangement also the switch J may be operated automatically by the failure of the consumer's supply from the sub-station.

In all the constructions illustrated the substations A' A² on either side of the sub-station A have been shown arranged in exactly the same manner as the substation A. It will be understood, however, that the adjacent substations may be arranged in other ways. For instance, a substation A having a single transformer as shown in Figure 2 or Figure 3 may be disposed between two substations, either or each of which has duplicate transformers E E' as shown in Figure 1, and vice versa.

The arrangements described and illustrated have been given by way of example only and modifications may be made without departing from the scope of the invention.

What I claim as my invention and desire to secure by Letters Patent is:—

1. An arrangement of circuits for a duplicate supply sub-station in an electric distribution system, including in combination two feeders from which the sub-station is supplied with power, a high tension circuit breaker disposed between and connecting the two feeders, and at least one transformer connected to the two feeders and from which the low tension supply is drawn.

2. An arrangement of circuits for a duplicate supply sub-station in an electric distribution system, including in combination two feeders from which the sub-station is supplied with power, a high tension circuit breaker disposed between and connecting the two feeders, at least one transformer connected to the two feeders and from which the low tension supply is drawn and at least one fuse of comparatively low rupturing capacity disposed between each transformer and the feeders.

3. An arrangement of circuits for a duplicate supply sub-station in an electric distribution system, including in combination two feeders from which the sub-station is supplied with power, a high tension circuit breaker disposed between and connecting the two feeders, a single transformer from which the low tension supply is drawn, and means for connecting this transformer to either of the two feeders.

4. An arrangement of circuits for a duplicate supply sub-station in an electric distribution system, including in combination two feeders from which the sub-station is supplied with power, a high tension circuit breaker disposed between and connecting the two feeders, a single transformer from which the low tension supply is drawn, a change-over switch whose position determines to which feeder the transformer is connected, and at least one fuse of comparatively low rupturing capacity disposed between the transformer and the two feeders.

5. An arrangement of circuits for a duplicate supply sub-station in an electric distribution system, including in combination two feeders from which the sub-station is supplied with power, a high tension circuit breaker disposed between and connecting the two feeders, at least one transformer connected to the two feeders and from which the low tension supply is drawn and electric protective gear for each feeder.

6. An arrangement of circuits for a duplicate supply sub-station in an electric distribution system, including in combination two feeders from which the sub-station is supplied with power, a high tension circuit breaker disposed between and connecting the two feeders, at least one transformer connected to the two feeders and from which the low tension supply is drawn and electric protective gear of the balanced type for each feeder so arranged as to include the high tension circuit breaker within each protected section.

7. An arrangement of circuits for a duplicate supply sub-station in an electric distribution system, including in combination two feeders from which the sub-station is supplied with power, a high tension circuit breaker disposed between and connecting the two feeders, at least one transformer connected to the two feeders and from which the low tension supply is drawn, at least one fuse of comparatively low rupturing capacity disposed between each transformer and the feeders and electric protective gear for each feeder so arranged as to include the high tension circuit breaker and a fuse within each protected section.

8. An arrangement of circuits for a duplicate supply sub-station in an electric distribution system, including in combination two feeders from which the sub-station is supplied with power and which each connect the substation with an adjacent substation, a high tension circuit breaker disposed between and connecting the two feeders, at last one transformer connected to the two feeders and from which the low tension supply is drawn and electric protective gear of the balanced type for each feeder.

9. An arrangement of circuits for a duplicate supply sub-station in an electric distribution system, including in combination two feeders from which the sub-station is supplied with power, a high tension circuit breaker disposed between and connecting the two feeders, a single transformer from which the low tension supply is drawn, means for connecting this transformer to either of the two feeders and electric protective gear for each feeder so arranged as to include the high tension circuit breaker within each protected section.

10. An arrangement of circuits for a duplicate supply sub-station in an electric distribution system, including in combination two feeders from which the sub-station is supplied with power, a high tension circuit breaker disposed between and connecting the two feeders, a single transformer from which the low tension supply is drawn, a change-over switch whose position determines to which feeder the transformer is connected, at least one fuse of comparatively low rupturing capacity disposed between the transformer and the two feeders, electric protective gear of the balanced type for each feeder, and a switch controlling the secondary circuits of such protective gear.

In testimony whereof I have signed my name to this specification.

JAMES ROBERT BEARD.